United States Patent [19]

Ashida et al.

[11] 4,055,522

[45] Oct. 25, 1977

[54] PROCESS FOR PRODUCING AN ISOCYANATE-BASED POLYMER HAVING REDUCED SMOKE GENERATION

[75] Inventors: Kaneyoshi Ashida, Chofu; Masaaki Ohtani, Kawasaki; Takashi Yokoyama, Yakuohji; Shoichi Ohkubo, Yokohama, all of Japan

[73] Assignee: Mitsubishi Chemical Industries Ltd., Tokyo, Japan

[21] Appl. No.: 614,933

[22] Filed: Sept. 19, 1975

[30] Foreign Application Priority Data

Sept. 26, 1974 Japan ................................. 49-110724

[51] Int. Cl.$^2$ ............................................. C08G 18/14
[52] U.S. Cl. ........................ 260/2.5 AW; 260/2.5 BB; 260/2.5 AJ; 260/2.5 AM; 260/77.5 AP; 260/77.5 NC; 260/77.5 SS
[58] Field of Search ................ 260/77.5 NC, 77.5 SS, 260/2.5 BB, 2.5 AJ, 2.5 AM, 77.5 AP, 2.5 AW

[56] References Cited

U.S. PATENT DOCUMENTS

| 3,179,626 | 4/1965 | Beitchman | 260/2.5 AW |
|---|---|---|---|
| 3,689,440 | 9/1972 | Glaesmann | 260/2.5 AJ |
| 3,793,236 | 2/1974 | Ashida et al. | 260/2.5 AW |
| 3,919,128 | 11/1975 | Baldino et al. | 260/2.5 AW |
| 3,931,065 | 1/1976 | Ashida et al. | 260/2.5 AW |

*Primary Examiner*—Eugene C. Rzucidlo
*Attorney, Agent, or Firm*—Bierman & Bierman

[57] ABSTRACT

There is disclosed a process for producing an isocyanate-based polymer by catalytically reacting a polyisocyanate alone or in combination with a polyhydroxy compound, the improvement in which an aromatic aldehyde having aldehyde group and no functional group capable of reacting with the isocyanate group, as a smoke suppressing agent is added to the reaction system.

11 Claims, No Drawings

PROCESS FOR PRODUCING AN ISOCYANATE-BASED POLYMER HAVING REDUCED SMOKE GENERATION

This invention relates to a process for producing an isocyanate-based polymer that generates less smoke on combustion. An isocyanate-based polymer, for example a polyurethane, has been widely used as a foamed material, and elastomer, a coating and an adhesive. Especially, the demand for a rigid polyurethane foam as a construction material has increased because of its lightness and excellent heat insulation property. However, for such usage it is essential to give such material fire resistance in order to protect gainst fire. In this connection, flammability has been reduced considerably. Another important problem is that in a fire many humans die by inhaling smoke generated in the fire and, therefore, the recent tendency has been to make the regulations more severe and to require that a construction material not only be fire resistant but also that it generates little or no smoke.

Among isocyanate-based polymers, a polyisocyanurate foam which is produced by trimerization of a polyisocyanate has excellent fire resistance and the amount of smoke generated on combustion is far less than with a polyurethane foam. In the initial stage of combustion, this material generates a large amount of black smoke; however, with the formation of a carbonized layer on the surface area, the amount of smoke generated is suddenly reduced. However, the amount of smoke generated is enough to disqualify the product from Class 2 fire resistance rating according to the Japan Industrial Standard (JIS) A-1321.

It is possible to produce a polyisocyanurate foam which contains a large amount of a halide compound and is rated Class 2 in fire resistance, but such foam possesses inherent disadvantages of increased friability and increased toxity of the gases produced by combustion, for example, hydrogen chloride and phosgene.

None of the processes proposed for the production of polyisocyanurate foam satisfies all the various requirements, such as, reduced smoke generation, high flame resistance, low toxicity, low friability and low flame-spread rating.

The following processes A-F have been proposed as smoke suppression process for a foamed material.

A. Accelerated carbonization

Ammonium polyphosphate (Japanese patent publication No. 15046/1974), phosphoric ester and p-nitroaniline sulfonic acid [NASA Technical Brief 70-10450 (1970] have been proposed as a smoke suppression material. However, such materials are not so effective for reducing smoke generation and when they are incorporated into a foam, they result in highly friable foam.

B. Reducing the calorific value

Powders of heat resistant inorganic material are incorporated into a foamed material to reduce the calorific value per unit weight thereby controlling combustibility and suppressing the smoke generation (U.S Pat. No. 3,625,872). If a large amount of such powder is incorporated, this process is effective but it causes difficulty in the production of a foamed material and a tendency forward increased friability of the product.

C. Diluting combustible gases

A cmpound which is decomposed by heat to generate an inert gas such as $CO_2$ and $NH_3$, for example, $CaCO_3$, $(NH_4)_2HPO_4$ and $(NH_4)_2SO_4$, is incorporated into a foamed material, whereby combustible gas generated from a foamed material is diluted to control the combustion and reduce the amount of smoke generated.

However, in order to achieve the intended effect, as in case of (B), a large amount of such inert gas generating material is to be added resulting in making it difficult to foam and producing a foamed material with inferior properties.

D. Introduction of heat resistant chemical structure

This process relates to the incorporation of a heat-resistant linkage into a polymer to control the thermal decomposition of the polymer thereby preventing the generation of combustible gases produced by thermal decomposition. For example, a foamed material containing, as heat-resistant linkage, such as isocyanurate linkage (Belgian Pat. No. 680380), carbodiimide linkage (Belgian Pat. No. 723151) and amide linkage U.S. Pat. No. 3,562,189) or a polyurethane foam containing a large amount of such linkages has less tendency of smoke generation than a polyurethane foam which does not contain such linkages, but such foamed material is not entitled to Class 2 of fire resistance according to JIS A-1321.

E. White smoke

If a polymer has a chemical structure which generates white smoke but less black smoke on combustion, then light transmission of the smoke generated is improved and this will achieve the same or a similar effect as in the case of generating a reduced amount of smoke. The tendency of the formation of white smoke is achieved, in general, by the use of an aliphatic polyol rather than an aromatic polyol. However, if an aliphatic isocyanate is used, it is difficult to produce a foamed material in virtue of its low reactivity.

F. Addition of a smoke suppressing agent

Fumaric acid (Japanese patent publication No. 42479/1973), ferrocene (Belgian Pat. No. 795480), $KBF_4$ (U.S. Pat. No. 3,725,319), $(NH_4)_2BF_4$ (U.S. Pat. No. 3,725,319), quinone and quinoimine (Japanese patent Public disclosure No. 8899/1973) have been proposed as a smoke suppressing agent. However, if such agent is added to a polyisocyanurate foam, it is not expected to obtain a semi-inflammable material satisfying Class 2 according to JIS A-1321.

The inventors have conducted intensive studies to find how to suppressing the smoke generation of an isocyanate-based polymer and found that, if an aromatic aldehyde containing aldehyde group and no functional group capable of reacting with the isocyanate group is added as a smoke suppressing agent, an unexpected and surprising effect for suppressing smoke generation is achieved, and this invention is accomplished on the basis of this knowledge. Thus, this invention is to provide a process for the production of an isocyanate-based polymer having reduced smoke generation by at least one reaction of polyaddition, polycondensatin and polymerization using a polyisocyanate having at least two isocyanate groups, there is used as part of the raw materials an aromatic aldehyde containing aldehyde group and no functional group capable of reacting with the isocyanate group.

It has been common knowledge that an aromatic compound will produce a large amount of black smoke on combustion, and therefore it is believed that this invention is unexpectedly unique. This invention will be explained in detail hereafter.

This invention will be applicable to a process for the production of a polymer in which polyisocyanate is subjected to at least one reaction of polyaddition, polycondensation and polymerization. The form of such polymer may be a resin, a foamed material, an elastomer, an adhesive or a coating, and preferably a foamed material and an elastomer, especially a rigid foamed material, such as modified and unmodified rigid polyurethane foam, modified and unmodified polyoxazolidone foam and modified and unmodified polyisocyanurate foam. Most preferred material is polyisocyanurate foam.

A typical example of a foamed material produced by polyaddition is a polyurethane foam obtained by the reaction of a polyol and a polyisocyanate the presence of a foaming agent, for example, a rigid, semi-rigid and flexible foamed material, and a rigid foamed material is especially suitable for this invention.

A polyoxazolidone foam produced by the reaction of a polyisocyanate and a polyepoxide is also classified in this category.

A typical example of a foamed material produced by polymerization of a polyisocyanate is a polyisocyanurate foam which is produced by trimerization of a polyisocyanate.

Typical examples of a foamed material produced by polycondensation of a polyisocyanate are polycarbodiimide foam produced from a polyisocyanate by decarboxylation, a polyamide foam produced from a polyisocyanate and a polycarboxylic acid by decarboxylation and a polyimide foam produced from a polyisocyanate and a polycarboxylic anhydride by decarboxylation.

A foamed material which is produced by effecting two or more of the abovementioned reactions simultaneously or in sequence may also be suitable for this invention. For example, an urethane modified polyisocyanurate foam, an oxazolidone modified polyisocyanurate foam, an urethanecarbodiimide modified polyisocyanurate foam, an amide-imide modified polyurethane foam and poly(urethane-oxazolidone-carbodiimide-isocyanurate) foam as well as foams containing various combinations of such linkages.

Among the abovementioned various foamed materials, unmodified polyisocyanurate foam, unmodified polycarbodiimide foam and unmodified polyimide foam generate less smoke but the unmodified polyisocyanurate foam involves inherent disadvantages such as high friability, the collapse of foams during shipment, loading and unloading and popping and bursting into fragments on exposing to flame. The latter two foams are difficult to handle in foaming operation and require costly raw materials. Accordingly, the latter two foamed materials have not yet been produced practically. Therefore, fire resistant foams suitable for practical use are urethane-modified polyisocyanurate foam, however, such modification results in the increased smoke generation since urethane linkage is incorporated into the foam. Therefore, the application of the process according to this invention to the production of such modified foamed materials, results in the product having an excellent suppressed smoke generation.

The polyurethane foams are exemplified in "Polyurethanes, Chemistry and Technology" (Interscience Publishers) by J. H. Saunders and K. C. Frisch. The polyisocyanurate foams are exemplified in "J. Cellular Plastics" Vol. 8, No. 3 (May/June), 1972, p. 160-167, by K. Ashida and K. C. Frisch.

Detail of poly(oxazolidone-isocyanurate) foamed material is disclosed in "J. Cellular Plastics" Vol. 8, No. 4 (July/August), 1972, p. 194–200 by K. Ashida and K. C. Frisch. Examples of polycarbodiimide foam are given in Belgian Patent 723151. Exmples of polyimide foam are disclosed in U.S. Pat. No. 3,300,420 and U.S. Pat. No. 3,562,189.

The polyisocyanates having at least two isocyanate groups which may be used according to this invention include a wide variety of organic and inorganic polyisocyanate compounds.

Examples of the organic polyisocyanate compound include, for example, an organic diisocyanate such as tolylene diisocyanate, isophorone diisocyanate, xylylene diisocyanate, 1,5-naphthylene diisocyanate, a mixed polyisocyanate, e.g. polyphenyl-polymethylene-polyisocyanate which is produced by phosgenation of precondensate of aniline and formaldehyde, undistilled tolylene diisocyanate.

Examples of inorganic polyisocyanate include, for example, silicon tetraisocyanate $[Si(NCO)_4]$ and various phosphorus polyisocyanates, such as $P(NCO)_3$ and $PO(NCO)_3$. Examples of other phosphorus polyisocyanate are a phosphoric compound, i.e. $RP(NCO)_2$ and $RP(O)(NCO)_2$ wherein R is an organic group.

A modified product of the abovementioned various polyisocyanates is also used as polyisocyanate component. For example, a mixture of polyisocyanate containing a certain compound having terminal isocyanate group, which is produced by reacting a polyisocyanate with a stoichiometrically less amount of water, mono- or poly-ol, mono- or poly-amine, mono- or poly-amide, mono- or poly-carboxylic acid or mono- or poly-epoxide.

Examples of such mixture are tolylene diisocyanate mixture containing polyisocyanate having urea and/or biuret linkage, which is obtained by heating tolylene diisocyanate and a small amount of water; tolylene diisocyanate mixture containing urethane prepolymer having terminal isocyanate group, which is obtained by reacting tolylene disisocyanate and a small amount of polyether polyol and polymethylene polyphenylene polyisocyanate mixture containing prepolymer which is chain extended with oxazolidone linkage, which is obtained by heating polymethylene polyphenylene polyisocyanate and a small amount of diepoxide in the presence of a catalyst.

The following materials may also be used:

An organic polyisocyanate containing carbodiimide linkage which is obtained by heating an orgaic polyisocyanate in the presence or absence of a catalyst, a polyisocyanate which is obtained by the reaction of an organic dihalide and sodium cyanate (Japanese patent publication No. 7269/1972) and a polyisocyanurate which is obtained by reacting an organic polyisocyanate in the presence of a trimerization catalyst thereby partially converting the polyisocyanate into a polyisocyanurate.

Other various prepolymers may be employed in this invention; for example, an urethane prepolymer containing terminal isocyanate group which is obtained by reacting one equivalent of polyether diol with more than two equivalents of tolylene diisocyanate and an oxazolidone prepolymer containing terminal isocyanate group which is obtained by heating more than two equivalents of an organic diisocyanate per a diepoxide in the presence of an oxazolidone forming catalyst, such as a quaternary ammonium halide, zinc bromide and zinc chloride.

Examples of polyhydroxy compound which may be used in polyaddition with a polyisocyanate include, a polyester and a polyether suitable for the conventional process for production of polyurethane, for example, a glycol having two hydroxy groups in the molecule, a polyether of a polymer and a copolymer of ethylene oxide and propylene oxide and a polyester derived from a polyhydric alcohol and polycarboxylic acid.

Examples of epoxy compound which may be used in polyaddition include a compound containing at least one oxirane ring, for example, a monoepoxy compound such as propylene oxide, 1,2-butene oxide, 2,3-butene oxide, styrene oxide, phenyl glycidyl ether and epichlorohydrine, a diepoxy compound such as glycidyl ether of bisphenol A, vinylcyclohexene dioxide and bis(3,4-epoxy-6-methyl cyclohexylmethyl) adipate, a polyepoxy compound such as glycidyl ethers of a novolak resin and of a polyhydric alcohol, and other various epoxy compounds such as glycidyl derivatives of a heterocyclic compound and of an aromatic primary amine and an epoxy derivative of an inorganic compound.

The aromatic aldehyde which may be used according to this invention is a compound which contains at least one aldehyde group attached directly or indirectly to aromatic ring but does not contain any other group capable of reacting with isocyanate group. However, the aldehyde may contain any substituent which is inert to isocyanate group, for example, alkyl such as methyl and isopropyl, alkoxy such as methoxy, tertiary amine such as dimethyl amino, nitro and halogen such as chlorine.

Examples of the compound having one aldehyde group include, for example, benzaldehyde, m-tolualdehyde, p-tolualdehyde, cumenaldehyde, p-chlorobenzaldehyde, p-nitrobenzaldehyde, anisaldehyde, p-dimethylamino-benzaldehyde, phenyl acetaldehyde and cinnamaldehyde.

Examples of the compound having two aldehyde groups include, for example, phthalaldehyde, isophthalaldehyde and terephthalaldehyde.

An aromatic heterocyclic aldehyde, for example, furfural, pyridine-2-aldehyde and pyridine -4-aldehyde, may also be employed.

Little or no smoke suppression effect is achieved from an aromatic aldehyde which contains any substituent capable of reacting with isocyanate group, such as salicylaldehyde and p-aminobenzaldehyde, and the smoke suppression effect of an aliphatic aldehyde such s butyraldehyde is inferior to that of an aromatic aldehyde and it gives a shrunk foamed material and therefore this compound is not desirable.

The mechanism why an aromatic aldehyde achieves smoke suppression effect according to this invention has not yet made fully clear. It is expected that this will be clarified when the type and amount of thermal decomposed materials of an isocyanate-based polymer and reaction product of such thermal decomposed material with the aromatic aldehyde are known. However, at the present, it is assumed that a polyisocyanate which is formed by thermal decomposition or an amine which is formed by reacting such polyisocyanate and water generated by combustion reacts with the aromatic aldehyde to form a certain heat resistant material, whereby the amount of organic materials of low molecular weight which will constitute smoke is reduced.

Further, the abovementioned material is then carbonized on combustion, so it is also believed that the aromatic aldehyde is a kind of a carbonization promotor.

The amount of the aromatic aldehyde to be used according to this invention may vary depending upon the type of the foamed material; a smaller amount is used for foamed material generating little smoke and on the other hand, more is used for foamed material generating more smoke. However, if too much is used, it results in a foamed material having inferior properties and especially in case of a rigid foamed material results in a shrunk material. The optimum amount for a particular type of foamed material will be determined by experiment.

In general, the amount of the aromatic aldehyde to be used ranges from 3 to 20%, preferably 5 to 15% by weight on the basis of the polyisocyanate.

Table 1 shows the relationship between the amount of the aromatic aldehyde and the amount of smoke generated by the foamed material. The foamed materials used in the experiments of Table 1 are produced by using the formulation given in Comparative Example 1 and adding thereto a predetermined amount of furfural. Smoke generation is measured according to ASTM D2843-70 (XP-2 smoke chamber test, Rohm and Haas) in which a sample of a cube of a foamed material of 50 × 50 × 50 (mm) is burned in a box and the amount of smoke generated is indicated in terms of "obscuration (%)" and the time taken to reach a predetermined and maximum obscuration is measured. The results are given in Table 1:

Table 1

| The amount of furfural (%) | Obscuration | | | | |
|---|---|---|---|---|---|
| | 30% (sec) | 50% (sec) | 90% (sec) | Max. Obs.[1] (%) | (sec) |
| 0 | 2 | 5 | 22 | 96 | 34 |
| 2 | 2.5 | 4.5 | 22 | 96 | 41 |
| 5 | 2.5 | 5 | 24 | 95 | 42 |
| 6 | 4.5 | 6 | 23 | 96 | 48 |
| 12 | 7 | 13 | 42 | 94 | 59 |
| 15 | 5 | 12 | 50 | 93 | 63 |
| 18 | 9 | 14 | 47 | 93 | 59 |

Note:
[1]Max. Obs.: Maximum Obscuratiion.

The way by which the aromatic aldehyde is added is optional and therefore the aldehyde may be added to any of an isocyanate component, or a polyol or other active hydrogen-containing component. From the point of view of storage stability of stock materials to be foamed, the procedure of addition may be chosen depending upon the formulation.

The catalyst with which a polyisocyanate is polymerized or is converted into a compound containing isocyanurate ring may be any type.

Examples of the trimerization catalyst which may be used according to this invention include, for example, the following compounds:

1. a tertiary amine, for example, a dialkylaminoalkylphenol such as 2,4,6-tris(dimethylaminomethyl) phenol, triethylamine, N,N',N''-(tris(dimethylaminoalkyl) hexahydrotriazine, tetraalkylalkylenediamine, diazobicyclooctane and a lower alkyl derivative thereof, 2. a combination of tertiary amine and a cocatalyst, the cocatalyst being, for example, ethyl alcohol, a monosubstituted carbamic ester, an aldehyde, an alkylene oxide, an alkylene imine, ethylene carbonate and 2,3-butane dione.

3. a tertiary alkyl phosphine 4. an alkali metal salt of an imide, for example, potassium phthalimide, 5. an onium compound, for example, a quaternary onium hydroxy compound of N, P, As and Sb and an onium hydroxy compound of S and Se,
6. an alkyl substituted ethylene imine, for example, N-methyl ethylene imine and phenyl-N,N-ethylene urea,
7. a metal salt of a carboxylic acid, for example, potassium acetate, lead 2-ethylhexanoate, sodium benzoate and potassium naphthenate,
8. an oxide, a hydroxide and a carbonate of an alkali and alkaline earth metal and a metal salt of an enolic and phenolic compound,
9. an epoxy compound,
10. a combination of an epoxy compound and a cocatalyst, the cocatalyst being, for example, a metal salt of a tertiary amine and an aromatic secondary amine such s sodium diphenyl amine,
11. an organic metal salt, for example, tin octanoate, titanium tetrabutoxide and tributyl antimony oxide,
12. a Friedel-Crafts catalyst, for example, aluminum chloride and boron trifluoride,
13. an alkali metal chelate compound such as sodium salicylaldehyde.

Of course, other catalysts which may be used for a conventional process of polyurethane production may be employed.

In the production of a foamed material according to this invention a foaming agent is used together with optionally a surface active agent.

The foaming agent which may be used according to this invention is, for example, (1) an inert compound having a low boiling point capable of vaporizing by the reaction heat, such as, pentane, benzene, trichloromonofluoromethane and trichlorotrifluoroethane, (2) a compound capable of reacting with isocyanate to produce a carbon dioxide such as water, a nitroalkane, aldoxime, formamide acetylacetone and nitrourea and (3) a compound capable of thermally decomposing by the reaction heat to produce a gas, such as ammonium bicarbonate, ammonium carbonate, sodium bicarbonate, paraformaldehyde, diazoamino benzene, azodibutyronitrile and dinitroso pentamethylenetetramine.

Though a foamed material may be produced without using a surface active agent, it is preferable to use a surface active agent to produce a foamed material having fine and uniform cell structure.

A wide variety of silicone surfactants and nonionic surfactant may be used and silicone surfactant is preferred.

A wide variety of additives may be added to the isocyanate compound, for example, an inert coloring material, such as dyestuff and pigment and additive type flame retardant, such as tris(p-chloroethyl)phosphate, tris(2,3-dibromopropyl)phosphate and the one disclosed in "Flammability Handbook for Plastics" by C. J. Hilado (Technomic Publishing Co., Inc.), p. 100–115.

It should be noted that the addition of inorganic powder results in increased friability of a foamed material and in some case the addition of additive type flame retardant increases smoke generation.

This invention will be explained by means of Examples and Comparative Examples, however, it should be understood that this invention is in no way limited by these Examples. In Examples "part" is by weight unless otherwise specified.

COMPARATIVE EXAMPLE 1

To a mixture of 100 parts of polymeric isocyanate (available from The Upjohn Co., Ltd., Mich., U.S.A., under the name of "Isonate 580" having an NCO equivalent of 145), 18 parts of trichloromonofluoromethane, 2 parts of silicone surfactant (available from Toray Silicone Co., Ltd., Tokyo, Japan, under the name of "SH-193"), 0.5 part of N,N',N''-tris(dimethyl aminopropyl)-sym-hexahydrotriazine and 1.0 part of potassium acetate solution consisting of 30% by weight of potassium acetate and 70% of ethylene glycol, the mixture being standard formulation, was added 10.0 parts of various aldehydes listed in Table 2 and the amount of smoke generated by the resulting polymers as measured. The results are given in Table 2:

Table 2

| Run No. | Additive | Max. % | Obs. Sec. | Appearance of the foam |
|---|---|---|---|---|
| 1 | None | 96 | 34 | Good |
| 2 | Salicylaldehyde | 97 | 23 | Good |
| 3 | p-aminobenzaldehyde | 99 | 22 | Cracked |
| 4 | butylaldehyde | 98 | 47 | Highly Shrunk |
| 5 | glyoxal | — | — | Cracked and highly Shrunk |
| 6 | octaldehyde | — | — | |

EXAMPLES 1 to 5

According to the standard formulation of the Comparative Example, 10% by weight of various aldehydes was added to polyisocyanate and the effects on suppressing smoke generation were examined. The results are given in Table 3.

Table 3

| Example No. | Additive | Max. % | Obs. Sec. | 50% Obs. Sec. | 90% Obs. Sec. |
|---|---|---|---|---|---|
| 1 | Benzaldehyde | 82 | 73 | 26 | — |
| 2 | Furfural | 92 | 59 | 14 | 47.4 |
| 3 | Terephthalaldehyde | 90 | 53 | 10 | 53 |
| 4 | Cinnamaldehyde | 92 | 45 | 6 | 26 |
| 5 | Anisaldehyde | 95 | 40 | 4 | 21 |

As shown in Run 1 of Table 2, when no smoke suppressing agent was added. The time required to reach maximum obscuration of 96% was 34 seconds, so it is clear that this invention is excellent in suppressing smoke generation.

EXAMPLE 6

Smoke suppressing effect obtained by addition of furfural to a rigid polyurethane foam.

118 G of polymeric isocyanate ("Isonate 580"), 10 g of tris(2-chloropropyl) phosphate, 36g of trichloromonofluoromethane, 41 g of sucrose-based polyether polyol (available from Asahi Denka Co., Ltd., Tokyo, Japan, under the name of "SC-1000" having OH equivalent of 125), 41 g of phosphorus-containing polyether polyol (available from Asahi Denka Co., Ltd., under the name of "EL-500" having OH equivalent of 127), 2.0 g of silicone surfactant (available from Union Carbide Corporation, N.Y., U.S.A., under the name of "L-5410"), 0.3 g of water, 0.8 g of tetramethyl guanidine and 0.5 g of tetramethyl hexamethylenediamine were used to produce a fire resistant rigid polyurethane foam containing no smoke suppressing agent (density: 0.031 g/cm³).

Smoke generation was examined by XP-2 Test and found Max. Obs. was 99% and the time required to reach this value was 14 seconds.

On the other hand, 11.8 g of furfural as a smoke suppressing agent was added to the abovementioned formulation, Max. Obs. of the resulting foamed material was 99% in 31 seconds. Thus, by the addition of 10% by weight of furfural to polyisocyanate, the time required to generate the same amount of smoke as made twice as long showing remarkable smoke suppressing effect.

EXAMPLE 7

The procedures similar to those of Example 6 were repeated excepting that 11.8 g of benzaldehyde was used instead of furfural to produce a foamed material. The maximum obscuration was 99% and the time required was 31 seconds.

EXAMPLE 8

Smoke suppressing effect obtained by the addition of furfural to urethane modified polyisocyanurate foamed material.

100 Parts of a prepolymer which had been prepared by reacting 100 parts of polymeric isocyanate ("PAPI-135" having NCO equivalent of 134, available from The Upjohn Co., Ltd.) and 4 parts of bis(hydroxyethyl) terephthalate at 100° C for 2 hours, 20 parts of trichloromonofluoromethane, 21.4 parts of sorbitol-based polyether polyol ("SP-600" having OH equivalent of 100, available from Asahi Denka Co., Ltd.), 2 parts of "SH-193", 4 parts of N,N',N''-tris(dimethylaminopropyl)-S-triazine and 10 parts of furfural were used to produce a foamed material having a density of 0.033 g/cm³. The time required to reach 90% Obs. was 22 seconds and Max. Obs. was 97% in 45 seconds.

EXAMPLE 9

Smoke suppressing effect obtained by the addition of furfural to oxazolidone-urethane-modified polyisocyanurate foamed material.

100 Parts of a prepolymer which had been produced by reacting 7 parts of polyepoxide ("Epikote 819", epoxy equivalent: 200, Shell Chemical Co., Ltd., Tokyo, Japan) and 93 parts of polymeric isocyanate ("PAPI-135") at 100° C for 2 hours, 20 parts of trichloromonofluoromethane, 23 parts of "SP-600", 2 parts of "SH-193", 4 parts of "Dabco 33LV" (a solution consisting of 33% by weight of triethylenediamine and 67% of dipropylene glycol) and 10 parts of furfural were used to produce a foamed material (density: 0.035 g/cm³). The smoke generation examined and found that the time to reach 50% Obs. was 5 sec., 90% Obs. was 45 sec., and Max. Obs. was 95% in 62 sec.

On the other hand, with a foamed material produced from a similar formulation but without addition of furfural the smoke generation was 90% Obs. requiring 23 sec. and Max. Obs. being 94% in 40 sec.

EXAMPLE 10

Smoke suppressing effect obtained by the addition of benzaldehyde to unmodified polyisocyanurate foam.

150 Parts of "Isomate 580", 27 parts of trichlorofluoromethane, 0.75 part of N,N',N''-tris(dimethylaminopropyl)-S-triazine, 1.5 parts of a potassium catalyst (30% potassium acetate solution in ethylene glycol), 3 parts of "SH-193" and 15 parts of benzaldehyde were employed to produce a foamed material. The temperature of the liquid stock was 21° C, the cream time was 20 seconds, rise time was 100 seconds and the density of the foam was 0.045 g/cm³.

The flame penetration test according to the procedures of Bureau of Mines, Report of Investigation No. 6366 was 92 minutes, the percent of weight retention of specimen by Butler Chimney Test using a sample of 20 × 20 × 100 mm according to the procedures described in "J. Cellular Plastics", Nov., 1967, p. 497 was 79.2%, the afterflame time was zero second, 50% Obs. time was 26 seconds and Max. Obs. was 82% in 73 seconds and the percent of weight loss by the friability test according to ASTM C-421 was 47%.

For comparison purpose, a similar foamed material not containing benzaldehyde was tested, and the flame penetration time as 85 minutes, the percent of weight retention was 81.7% and Max. Obs. was 96% in 34 seconds.

EXAMPLE 11

Smoke suppressing effect obtained by addition of furfural to unmodifiedpolyisocyanurate resin.

A mixture of 30 g of "Isomate 580", 1 g of N,N',N''-tris(dimethylaminopropyl)-S-triazine and 3.0 g of furfural was charged into a mold to obtain a resin plate which was cured at 70° C for 1 hour. A specimen of 7 × 25 × 25 mm was subjected to smoke generation test and Max. Obs. was 92% in 75 seconds.

For comparative purpose, a specimen produced by similar procedures but not containing furfural was tested and Max. Obs. was 95% in 45 seconds.

EXAMPLE 12

Smoke suppressing effect obtained by addition of cinnamaldehyde.

A foamed material was produced according to procedures similar to those of Example 10 but 15 parts of cinnamaldehyde was used.

At a temperature of 20° C, the cream time as 18 seconds and the rise time was 70 seconds, and the product had a foam density of 0.039 g/cm³, the flame penetration time was 123 minutes, the percent of weight retention was 87%, the afterflame time was zero second, the percent of weight loss by friability test was 38%, 50%· Obs. time as 6.2 seconds, 90% Obs. time was 26 seconds and Max. Obs. was 92% in 45 seconds.

What is claimed is:

1. A process for producing an isocyanate-based polymer having reduced smoke generation which comprises reacting, in the presence of a trimerization catalyst, a polymethylene polyphenylene polyisocyanate produced by the phosgenation of a precondensate of aniline and formaldehyde, the improvement which comprises the addition to the reaction system in an amount of from 3 to 20% by weight based on the amount of said polyisocyanate present, of an aromatic aldehyde having an aldehyde group and no other functional group capable of reacting with anisocyanate group.

2. A process for producing an isocyanate-based polymer according to claim 1, in which said aromatic aldehyde contains not more than two aldehyde groups attached directly or indirectly to an aromatic ring.

3. A process for producing an isocyanate-based polymer according to claim 1, in which said aldehyde is benzaldehyde.

4. A process for producing an isocyanate-based polymer according to claim 1, in which said aldehyde is furfural.

5. A process for producing an isocyanate-based polymer according to claim 1, in which said aromatic aldehyde is terephthalaldehyde.

6. A process for producing an isocyanate-based polymer according to claim 1, in which said polymerization is effected in the presence of a foaming agent.

7. A process for producing an isocyanate-based polymer according to claim 1, in which said polyisocyanate is a mixture containing an urethane prepolymer which contains a terminal isocyanate group and the reaction is effected in the presence of a foaming agent.

8. A process for producing an isocyanate-based polymer according to claim 1, in which said polyisocyanate compound is a mixture containing an oxazolidone prepolymer which contains a terminal isocyanate group and the reaction is effected in the presence of a foaming agent.

9. A process for producing an isocyanate-based polymer according to claim 1, in which a polyhydroxy compound, selected from the group consisting of a polyether of a polymer and a copolymer of ethylene oxide and propylene oxide, is added to the reaction system in such an amount that the equivalent ratio of NCO/OH is more than 1.

10. A process for producing an isocyanate-based polymer according to claim 9, in which said polyhydroxy compound is a sorbitol-based polyetherpolyol.

11. A process for producing an isocyanate-based polymer according to claim 1, in which the aromatic aldehyde is added to the reaction system in an amount of 5 to 15% by weight based on the amount of polyisocyanate present.

* * * * *